United States Patent
Adam et al.

(10) Patent No.: US 9,004,021 B2
(45) Date of Patent: Apr. 14, 2015

(54) COMBUSTION ENGINE WITH COOLANT COLLECTOR FOR SHUT-DOWN COOLING AND/OR WARM-UP COOLING

(75) Inventors: Stephan Adam, Lenting (DE); Joachim Doerr, Ingolstadt (DE); Axel Pohlmann, Stammham (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/704,949

(22) PCT Filed: Jun. 15, 2011

(86) PCT No.: PCT/EP2011/002957
§ 371 (c)(1),
(2), (4) Date: Feb. 19, 2013

(87) PCT Pub. No.: WO2011/157417
PCT Pub. Date: Dec. 22, 2011

(65) Prior Publication Data
US 2013/0206085 A1   Aug. 15, 2013

(30) Foreign Application Priority Data
Jun. 18, 2010 (DE) .......................... 10 2010 024 319

(51) Int. Cl.
*F02F 1/10* (2006.01)
*F02F 1/02* (2006.01)
(Continued)

(52) U.S. Cl.
CPC . *F02F 1/02* (2013.01); *F01N 3/046* (2013.01); *F01N 13/10* (2013.01); *F02F 1/243* (2013.01); *F02F 1/40* (2013.01); *F01P 2003/028* (2013.01);
(Continued)

(58) Field of Classification Search
CPC ... F01P 3/02; F01P 2003/024; F01P 2050/06; F02F 1/243; F02F 1/42
USPC ...... 123/41.01, 41.72, 198 R, 41.82 R, 41.75, 123/41.81, 41.67
See application file for complete search history.

(56) References Cited

U.S. PATENT DOCUMENTS

| 4,455,973 | A | | 6/1984 | Stadler et al. | |
|---|---|---|---|---|---|
| 4,545,332 | A | * | 10/1985 | Suzuki et al. | ............... 123/41.01 |

(Continued)

FOREIGN PATENT DOCUMENTS

| DE | 1961322 | 6/1971 |
|---|---|---|
| DE | 3208341 | 9/1983 |

(Continued)

*Primary Examiner* — Noah Kamen
*Assistant Examiner* — Long T Tran
(74) *Attorney, Agent, or Firm* — Henry M. Feiereisen LLC.

(57) ABSTRACT

An internal combustion engine includes a cylinder crankcase and a cylinder head that includes an integrated exhaust manifold, wherein the cylinder crankcase, the cylinder head and the integrated exhaust manifold have a continuous water jacket that forms part of a coolant circuit of the internal combustion engine. To ensure during shut-down cooling and/ or warm-up cooling of the exhaust manifold that a majority of the coolant that is fed into the water jacket reaches the exhaust manifold, while only a small portion of the coolant flows around the cylinder through the cylinder crankcase, the coolant circuit includes a collector that communicates via passage openings having reduced opening cross-sections with the water jacket, and coolant channels arranged in extension of a flow direction through the passage-openings lead to the exhaust manifold, while coolant channels branching off laterally behind the passage-openings lead to the cylinder crankcase.

10 Claims, 4 Drawing Sheets

(51) Int. Cl.
*F01N 3/04* (2006.01)
*F01N 13/10* (2010.01)
*F02F 1/24* (2006.01)
*F02F 1/40* (2006.01)
*F01P 3/02* (2006.01)
*F01P 7/14* (2006.01)

(52) U.S. Cl.
CPC ....... *F01P 2007/143* (2013.01); *F01P 2060/08* (2013.01); *F01P 2060/16* (2013.01); *Y02T 10/20* (2013.01)

(56) References Cited

U.S. PATENT DOCUMENTS

| | | | | |
|---|---|---|---|---|
| 6,164,251 | A | * | 12/2000 | Nishimura et al. ........... 123/54.4 |
| 6,612,272 | B2 | * | 9/2003 | Kato et al. ............. 123/41.82 R |
| 6,672,296 | B2 | * | 1/2004 | Ito et al. ......................... 123/672 |
| 7,367,294 | B2 | | 5/2008 | Rozario et al. |
| 7,992,535 | B2 | * | 8/2011 | Steiner et al. ........... 123/196 AB |
| 2007/0215074 | A1 | * | 9/2007 | Rozario et al. ......... 123/41.82 R |
| 2007/0251227 | A1 | * | 11/2007 | Tsubouchi ...................... 60/321 |
| 2009/0151687 | A1 | * | 6/2009 | Kong et al. ................. 123/193.5 |
| 2012/0048217 | A1 | | 3/2012 | Triebe et al. |

FOREIGN PATENT DOCUMENTS

| | | |
|---|---|---|
| DE | 3328000 A1 | 2/1985 |
| DE | 10047080 | 4/2002 |
| DE | 10318744 | 11/2004 |
| DE | 102004062293 | 9/2005 |
| DE | 102007012089 | 10/2007 |
| DE | 102006044680 | 4/2008 |
| JP | 56 006925 U | 1/1981 |
| JP | H 05-66243 | 9/1993 |
| JP | 2004-108159 | 4/2004 |
| JP | 2008 075507 A | 4/2008 |
| JP | 2009-047001 | 3/2009 |
| JP | 2009-191661 | 8/2009 |
| JP | 2009 216063 A | 9/2009 |
| JP | 2009257227 A | 11/2009 |
| JP | 2009275575 A | 11/2009 |

* cited by examiner

COMBUSTION ENGINE WITH COOLANT COLLECTOR FOR SHUT-DOWN COOLING AND/OR WARM-UP COOLING

CROSS-REFERENCES TO RELATED APPLICATIONS

This application is the U.S. National Stage of International Application No. PCT/EP2011/002957, filed Jun. 15, 2011, which designated the United States and has been published as International Publication No. WO 2011/157417 A1 and which claims the priority of German Patent Application, Ser. No. 10 2010 024 319.1, filed Jun. 18, 2010, pursuant to 35 U.S.C. 119(a)-(d).

BACKGROUND OF THE INVENTION

The invention relates to a combustion engine and to a method for operating an internal combustion engine.

In an internal combustion engine with an exhaust manifold which is integrated in the cylinder head, larger amounts of heat energy are stored in the exhaust manifold than in conventional internal combustion engines with an external exhaust manifold. This may lead to the coolant in the integrated exhaust manifold medium starting to boil after turning off the internal combustion engine, which would lead to damage to the coolant. Such an undesired boiling of the coolant in the region of the exhaust manifold can be avoided in that the integrated exhaust manifold is still cooled for a certain period of time by a so called shut down cooling after turning off the internal combustion engine.

However, when the shut down cooling occurs by circulating the coolant by means of an electric coolant pump through a continuous water jacket of the cylinder crankcase, the cylinder and the integrated exhaust manifold, only a relatively small portion of the circulated coolant is conducted into the exhaust manifold. In order to ensure a sufficient cooling, the electric coolant pump thus has to circulate a large amount of coolant and with this has to be dimensioned correspondingly great.

In addition, the fast warming up of internal combustion engines after the cold start will be very important in the future because this not only allows ensuring a decrease in friction after the cold start and with this a lower fuel consumption, but also a decrease of pollutant emission. In an internal combustion engine of a motor vehicle, a fast warming up also allows conducting warmed-up coolant to the heater heat exchanger of the motor vehicle in order to heat the interior of the motor vehicle for increasing the comfort of the passengers, However, a fast heating up of the internal combustion engine requires that the coolant in the water jacket of the internal combustion engine is not or hardly moved immediately after its star. This in turn is only possible until the coolant, at the sites where it heats up the fastest, almost reaches its boiling point. In internal combustion engines with integrated exhaust manifold, one of these sites is located in the integrated exhaust manifold. When a boiling of the coolant is to be prevented in this location by circulating the coolant through the water jacket, similar problems arise as previously described for the shut down cooling. This means, only a relatively small amount of the circulated coolant reaches the integrated exhaust manifold while a relatively large amount of the coolant circulates through the cylinder crankcase. As a result, the cylinders are unnecessarily cooled there so that at least the desired lowering of the friction and the fuel consumption cannot be achieved.

SUMMARY OF THE INVENTION

Based on this, the invention is based on the object to ensure, in spite of a continuous water jacket, that during an shut-down cooling and/or warm-up cooling of the exhaust manifold, a predominant portion of the coolant which is supplied into the water jacket reaches the integrated exhaust manifold, while only a small portion of the coolant flows around the cylinders through the cylinder crankcase.

According to the invention, this object is solved in that the coolant circuit includes a collector which communicates with the water jacket through passage openings with a reduced opening cross section, and in that cooling channels of the water jacket which are arranged in straight extension of a direction of flow in the passage openings lead to the exhaust manifold, while cooling channels of the water jacket which branch off laterally behind the passage openings lead into the cylinder crankcase.

The invention is therefore based on the idea to strongly accelerate the coolant which is supplied into the collecting rail by reducing the opening cross sections of the passage openings inside the passage opening, so that the coolant has a high flow impulse when exiting the passage openings. This flow impulse causes the predominant portion of the coolant to flow straight ahead behind the passage openings i.e., in extension of the direction of flow inside the passage openings further through the coolant channels which are generally aligned with the passage openings and to the exhaust manifold, while only a small portion of the coolant is deflected into the cooling channels which behind the passage openings branch off laterally into the cylinder crankcase. The previously described flow conditions were confirmed by mathematical simulations, according to which a very large portion of the coolant which is supplied to the collecting rail, indeed reaches in the integrated exhaust manifold. With this, the cooling of the integrated exhaust manifold can be improved in the after shut down and in the warm up of the internal combustion engine without large amounts of coolant having to be circulated through the water jacket.

The terms water jacket of the cylinder crankcase, water jacket of the cylinder head, and water jacket of the integrated exhaust manifold used in the following do not relate to water jackets that are separate from each other, but rather a single continuous water jacket whose parts which are recessed in the cylinder crankcase or cooling channels communicate with each other.

A preferred embodiment of the invention provides that the coolant can be supplied to the collecting rail for warm up cooling of the exhaust manifold by means of a main coolant pump which is contained in a main circuit of the coolant circuit and for shut down cooling by means of an electric cooling pump contained in a side branch of the coolant circuit, when after turning off the internal combustion engine the main coolant pump which is driven by the internal combustion engine is at a standstill. Because due to the combinations of the features of the invention, the predominant portion of the coolant is conducted into the integrated exhaust manifold and thus a relatively small portion of the coolant steam is sufficient for its cooling, the electric coolant pump can be dimensioned smaller then in the case when coolant circulates the entire water jacket. During the normal operation of the internal combustion engine, the electric coolant pump is turned off and the coolant is circulated by means of the main coolant pump, wherein however, it is not conducted into the side branch and the collecting rail but rather through at least one other inlet in the water jacket of the internal combustion engine, in order to conduct it through cooling channels of the water jacket so that the coolant first flows through the cylinder crankcase and then the cylinder head and the exhaust manifold.

In internal combustion engines of motor vehicles, at least one heater heat exchanger is integrated in the side branch which leads to the collecting rail, so that during warm up of the internal combustion engine a fast warming up of the interior of the motor vehicle is possible, if needed. The side branch can further serve for cooling an exhaust gas turbocharger of the shut off internal combustion engine. Because coolant has to be supplied to the exhaust gas turbocharger also during the normal operation of the internal combustion engine, the turbocharger is expediently also connected to the main circuit of the coolant circuit.

According to another preferred embodiment of the invention, the collector is integrated into the cylinder crankcase because this enables a simple connection of the collector to the water jacket of the cylinder crankcase. In this case, the passage openings with the reduced opening cross sections are expediently arranged in upward oriented outlet channels of the collector, in whose extension which the coolant channels which lead to the water jacket of the exhaust manifolds lead upwards.

The integration of the collector into the cylinder crankcase also has the advantage that flow passages which are already present in the cylinder head sealing, through which during normal operation of the internal combustion engine a portion of the coolant flows into the water jacket of the cylinder head and the exhaust manifolds, can be used, in order to conduct the coolant which flows out of the collector after shutoff or during warm up into the coolant channels of the water jacket of the exhaust manifold. This obviates a modification of already existing cylinder heads with integrated exhaust manifold. The passage openings of the collector are then advantageously arranged below the flow passages of the cylinder head sealing in the upwards oriented outlet channels of the collector, so that the predominant portion of the coolant which flows through the outlet channels and the passage openings and is accelerated by the passage openings during after running or warm up flows in straight line upwards through the flow passages of the cylinder head sealing and then into the water jacket of the exhaust manifold. On the other hand, the coolant channels which lead into the water jacket of the cylinder crankcase branch off below the cylinder head sealing or from its flow passages towards one or more sides from the outlets sot that only a small portion of the coolant flows into these coolant channels.

When operating the internal combustion engine according to the invention, the coolant which is circulated through the coolant circuit is supplied into the collector after turning off and/or during warm up of the internal combustion engine, in order to be able on one hand to sufficiently cool the exhaust manifold and on the other hand to limit the amount of coolant which has to be circulated through the water jacket of the internal combustion engine for this purpose. The supply of the coolant into the collector occurs preferably through a side branch of the coolant circulation, through which during normal operation of the internal combustion engine, no coolant is circulated. In internal combustion engines of motor vehicles, the coolant can be supplied through a heater heat exchanger into the collector, in order to ensure a fast heating up of the interior of the motor vehicle.

BRIEF DESCRIPTION OF THE DRAWING

In the following, the invention is explained in more detail by way of an exemplary embodiment shown in the drawing. It is shown in.

DETAILED DESCRIPTION OF PREFERRED EMBODIMENTS

Figure 1:
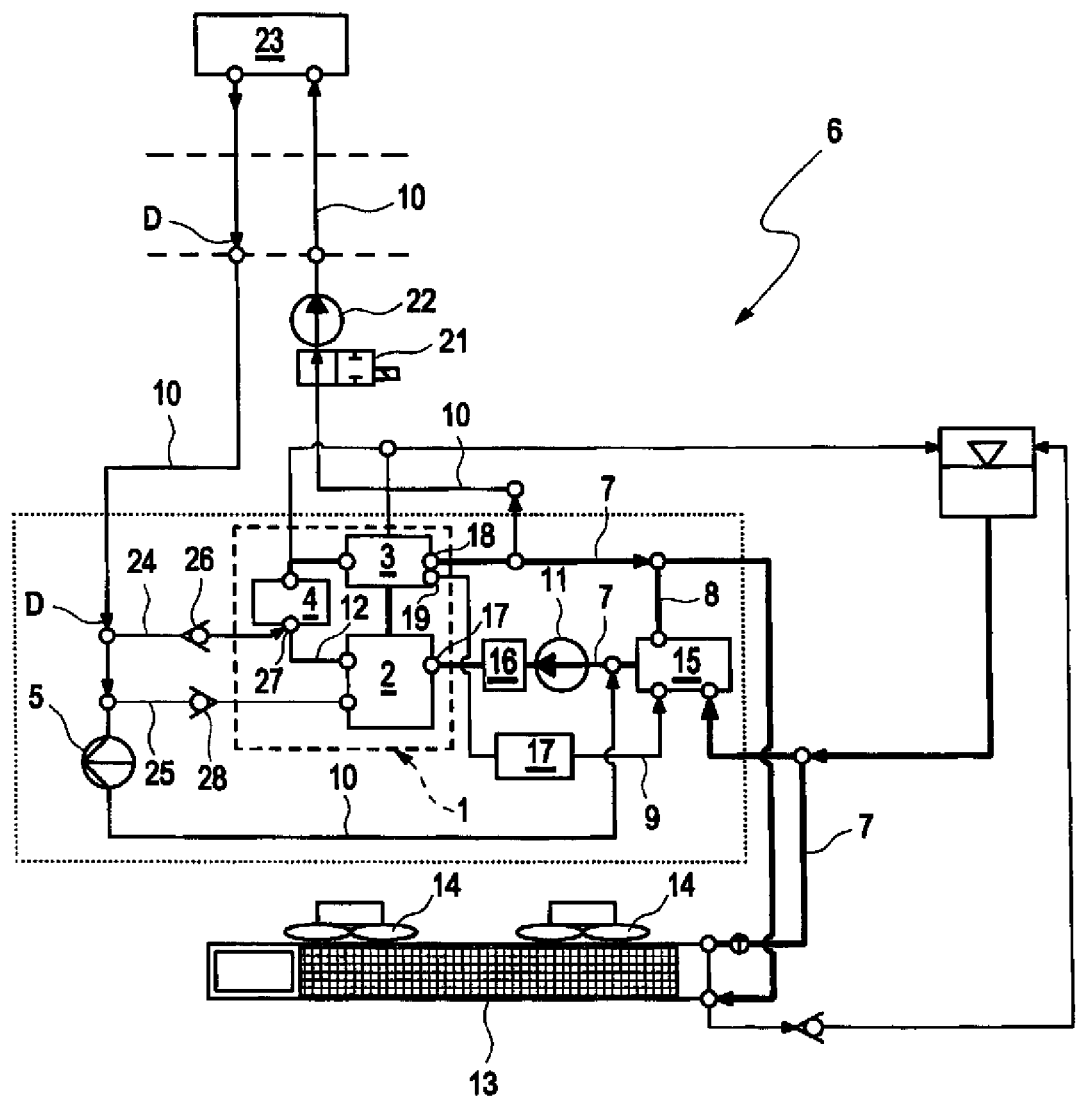
FIG. 1 a schematic representation of a coolant circuit of an internal combustion engine with integrated exhaust manifold.

The internal combustion engine 1 of a motor vehicle which is shown only schematically in FIG. 1, has a cylinder crankcase 2, a cylinder head 3, and an exhaust manifold integrated into the cylinder head 3, and an exhaust gas turbocharger 5 and is cooled by a liquid coolant which is circulated through the coolant circuit 6.

As shown in FIG. 1, the coolant circuit includes a main circuit 7, a short circuit branch 8, a motor cooling branch 9 and a side branch 10. The main circuit 7 includes a main coolant pump 11 which is driven by the internal combustion engine 1, which main coolant pump 11 circulates the coolant during normal operation of the internal combustion engine 1, wherein the coolant first flows through a water jacket 12 of the internal combustion engine 1 and then through a main cooler 13 with fan 14, and back to the main coolant pump 11. The main circuit 7 further includes a rotary slide which is arranged before the main coolant pump 11 and which can be adjusted during warm up of the internal combustion engine so that the coolant which is conducted through the water jacket 12, flows directly and un-cooled back through the short circuit branch 8 by bypassing the main cooler 13. The main circuit 7 also includes a second rotary slide 16 which is arranged behind the main coolant pump 11, with which second rotary slide 16 the flow amount of the coolant which is circulated by the main coolant pump 11 through the main circuit 7 can be controlled. The water jacket 12 of the internal combustion engine 1 is connected with the main coolant pump 11, and to the main cooler or the short circuit branch 8 by an inlet which is arranged on the cylinder crankcase 2.

The motor cooler branch 9 includes a motor cooler 17, which is arranged behind the second outlet 19 of the water jacket 12 on the cylinder head 3 and before the first rotary slide 15 in the motor cooling branch 9, so that by means of the rotary slide 15 a portion of the coolant can be conducted through the motor cooler 17 for cooling the motor oil.

The side branch 10 branches off from the main circuit 7 between the water jacket 12 of the internal combustion engine 1 and the main cooler 13 or the short circuit branch 8, contains a controllable check valve 21, an electric coolant pump 22 which can be switched on and off, and a heat exchanger 23 of an internal heater of the motor vehicle and leads then to the exhaust gas turbocharger 5, which can be cooled by the coolant which flows through the side branch 10. Between the first rotary slide 15 and the main coolant pump 11 the side branch 10 leads into the main circuit 7 again and is connected with the water jacket 12 of the internal combustion engine 1 by two lines 24, 25. The first 24 of the two lines 24, 25 branches off from the side branch 10 behind the heat exchanger 23, contains a return valve 26 which allows only a flow out of the side branch 10 into the water jacket 12, and leads into a coolant collector 27, which is explained in the following in more detail with reference to the FIGS. 3 to 6. The second line 25 leads from the water jacket 12 to the side branch 10 into which it enters behind the branch-off of the first line 245 and before the exhaust gas turbocharger 5. The second line 25 also contains a check valve 28 which only allows flow from the water jacket 12 into the side branch 10 so that the exhaust gas turbocharger 5 can either by supplied with coolant through the main circuit 7 and the second line 25 or through the side circuit 10.

Figure 2:
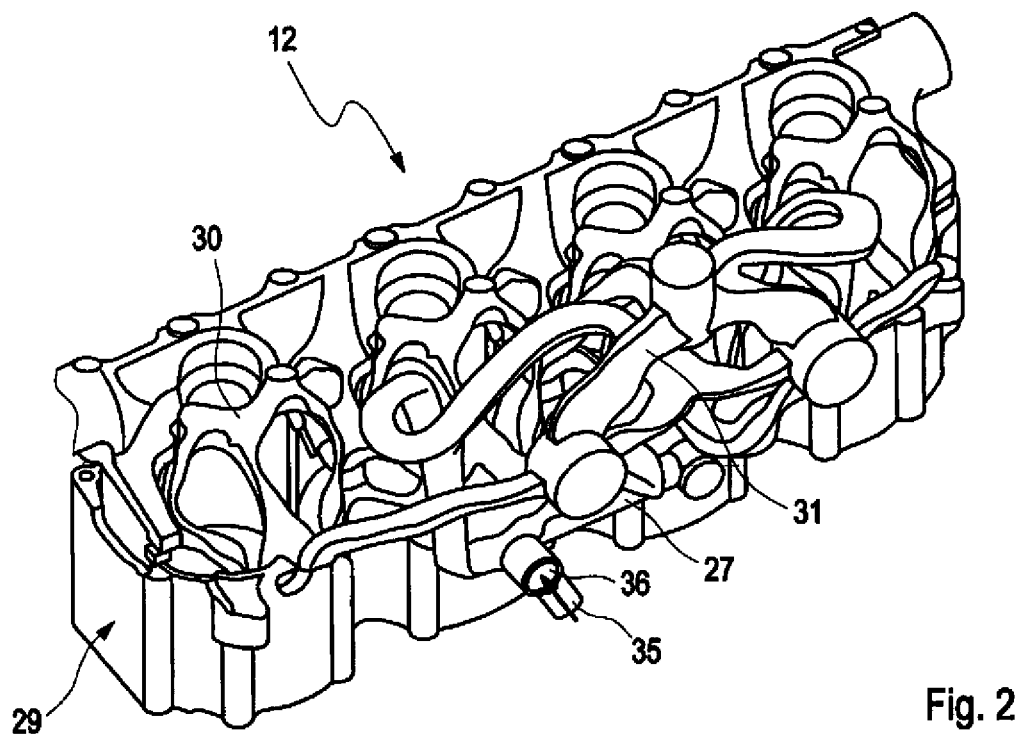
FIG. 2 a perspective view of the water jacket of the internal combustion engine and a collector connected to the water jacket.

As best shown in FIG. 2, the water jacket 12 of the internal combustion engine includes three connected or communicating parts 29, 30, 31 which are recessed in the cylinder crankcase 2, in the cylinder head 3 or in the integrated exhaust manifold 4, wherein in the following the part 29 is referred to as water jacket of the cylinder crankcase 2, part 30 as water jacket of the cylinder head, and part 31 as water jacket of the exhaust manifold.

Figure 4:
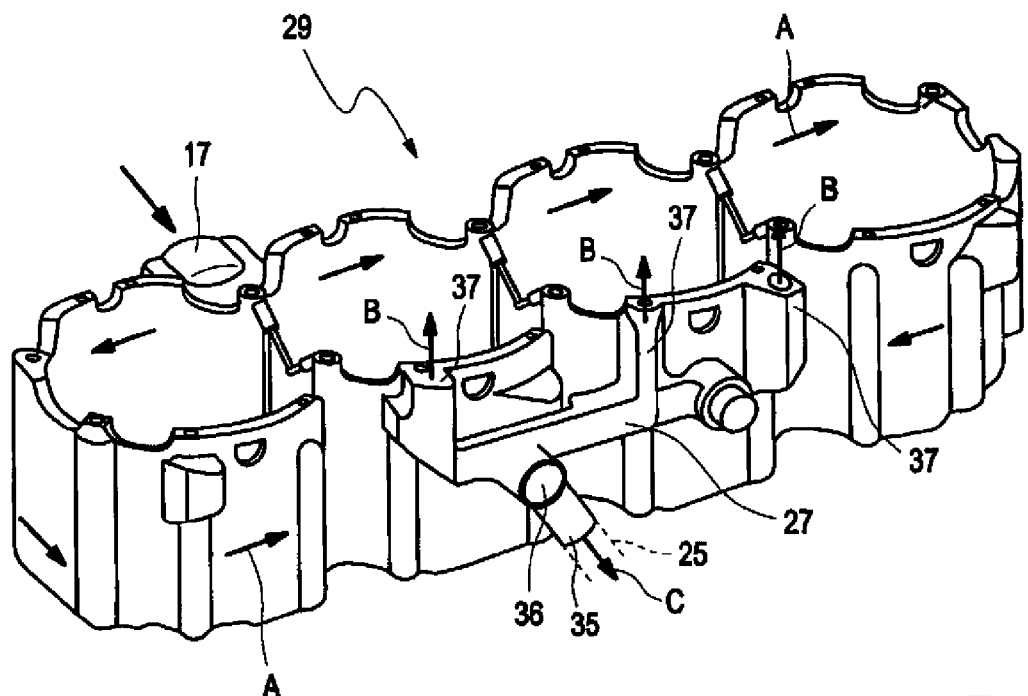
FIGS. 4 and 5 perspective views corresponding to FIG. 3 for explaining the flow conditions in the water jacket of the cylinder crankcase during normal operation or after turning off and during warm up of the internal combustion engine.
Figure 5:
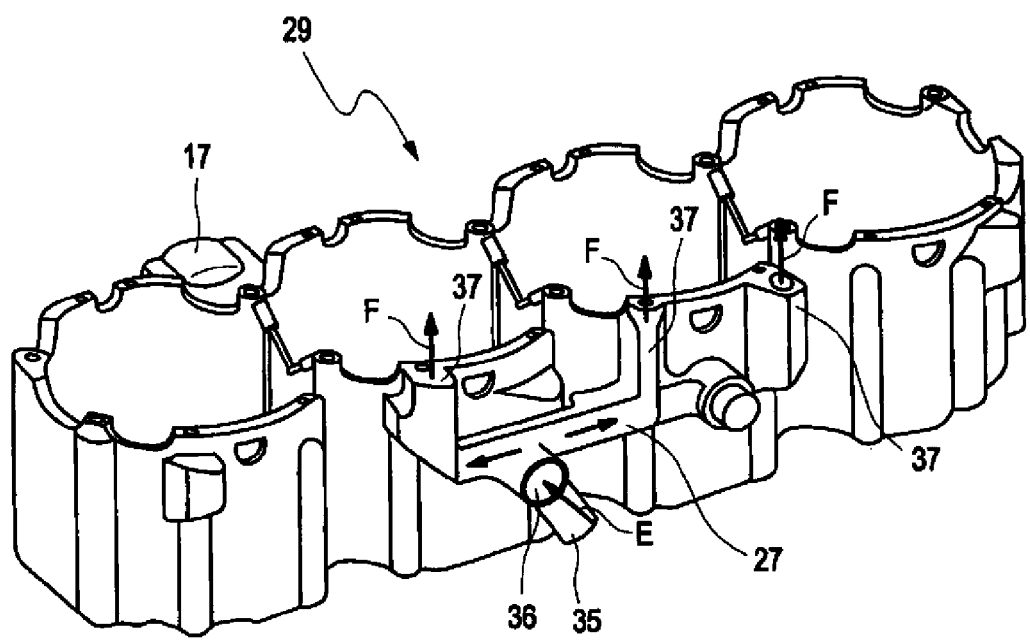
Figure 6:
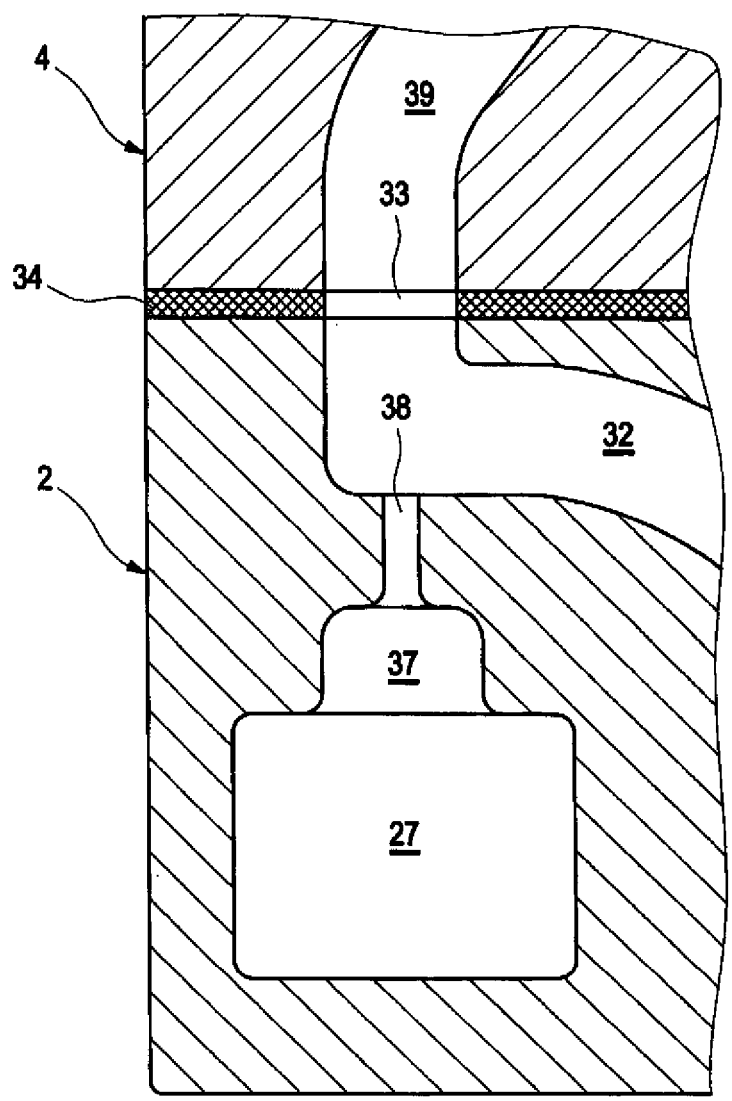
FIG. 6 an enlarged schematic sectional view taken along the line VI-VI of FIG. 3, for explaining the functioning of the collector.

As shown in FIGS. 1 and 4, during normal operation of the internal combustion engine, the coolant is supplied to the water jacket 29 of the cylinder crankcase 2 from the main circuit 7. As indicated by the arrow A in FIG. 4, the coolant flows first around the cylinder through the water jacket 29 of the cylinder crankcase 29, before the predominant portion exits the cylinder crankcase 2 above the collector 27 upwards through coolant channels 32 and flow passages 33 or a cylinder head sealing 34 (FIG. 6). From there, the coolant flows through the coolant channels 39 which border the flow passages 33, into the water jacket 31 of the exhaust manifold 4, and into the water jacket 30 of the cylinder head 3, from which it exits again through one of the outlets 18, 19 (FIG. 1). A further portion of the coolant which is supplied to the cylinder crankcase 2 flows through an outlet 35 which is arranged below the collector 27 on the cylinder crankcase 2, through the line 25 to the exhaust gas turbocharger 5, as indicated by the arrow C in FIG. 4.

In order to prevent boiling of coolant in the water jacket 31 of the exhaust manifold 4 after turning off the internal combustion engine 1 and the resulting standstill of the main coolant pump 11, due to a large amount of heat stored in the exhaust manifold 4 during operation, the exhaust manifold 4 is also cooled by a shut down cooling in addition to the exhaust gas turbocharger 5. For this purpose, the electric coolant pump 22 is activated and the vale 21 in the side branch 10 opened, in order to circulate coolant from the main branch 7 through the side branch 10 in the direction of the arrows D in FIG. 1. A portion of the circulated coolant cools the exhaust gas turbocharger 5, while the remaining portion is supplied through the inlet 36 of the collector 27 into the water jacket 12, as indicated by the arrow E in FIG. 5, from where a predominant portion of the supplied coolant flows upwards into the exhaust manifold 4 as shown by the arrows F in FIG. 5. The collector helps avoiding that a significant portion of the coolant which is supplied into the water jacket 12 flows through the cylinder crankcase 2 without effect and does not reach the water jacket 31 of the exhaust manifold 4 as desired.

Figure 3:
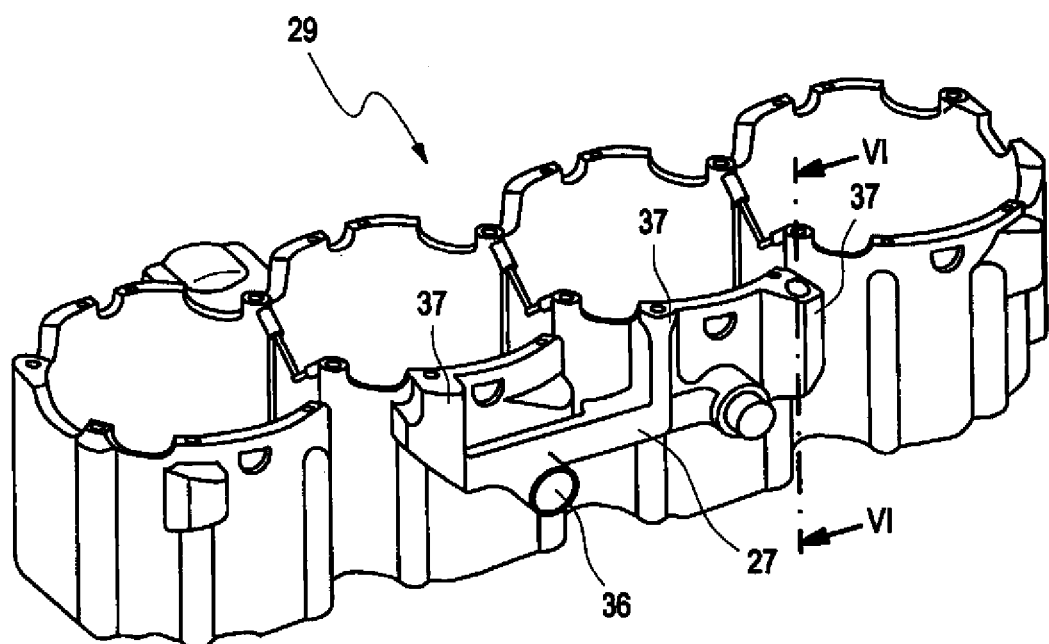
FIG. 3 a slightly enlarged perspective view of the water jacket of the cylinder crankcase and the collector.

As best shown in FIGS. 3 and 6, the essentially horizontal collector 27 which is integrated into the cylinder crankcase 2 has for this purpose multiple upwards oriented outlets 37 whose number expediently corresponds to the number of coolant channels 31 in the exhaust manifold 4. As shown in FIG. 6 by way of example of one of the outlets 37, a vertically oriented passage opening 38 with a reduced opening cross section is arranged in each of the outlets 37. In the passage opening 38 the coolant which is conducted into the collector 27 is strongly accelerated as a result of the narrowing of the cross section, so that it has a strong upwards oriented flow impulse immediately behind the passage opening. Behind or above the passage opening 38, each outlet branches into the two coolant channels 32, 39. While the coolant channel 39 in extension of the direction of flow of the coolant in the passage opening 38, leads through the flow passage 33 of the cylinder head sealing 34, which flow passage 33 is arranged above the passage opening 38, into the water jacket 31 of the exhaust manifold 4 (FIG. 2) located above the cylinder head sealing 34, the other coolant channel 32 branches off at about a right angle and then leads into the water jacket 29 of the cylinder crankcase 2. Due to its strong upwards oriented flow impulse behind the passage opening 38, the predominant portion of the coolant flows through the flow passage 33 of the cylinder head sealing 34 into the coolant channel 39 and further into the water jacket 31 of the exhaust manifold, while it is deflected into the coolant channel 32 only to a small degree and from there flows into the water jacket 29 of the cylinder crankcase 2. The coolant which flows through the water jacket 31 of the exhaust manifold 4 subsequently flows through the water jacket 30 of the cylinder head 3 to the outlet 18 and/or 19.

The same effect described above as in the shut down cooling is also used during the warm up of the internal combustion engine 1. In order to quickly heat up the internal combustion engine after a cold start, the coolant in the water jacket of the internal combustion engine is initially not or only to a minimal degree circulated, by correspondingly controlling both rotary slides 15, 16. This is continued until a circulation of the coolant is necessary at the hottest sites, inter alia in the integrated exhaust manifold 4. For this purpose, the two rotary slides 15, 16 are controlled so that the coolant only flows through the side branch 10 from which it is then conducted through the line 24 into the inlet 36 of the collector 27, in order to cool the exhaust manifold 4. After passage through the water jacket 31 of the exhaust manifold 4 and the water jacket 30 of the cylinder head 3, the coolant is conducted back from the outlet 18 through the main circuit 7 and the short circuit branch 8 to the main coolant pump 11, from where it is again conducted through the side branch 10. The coolant which is heated up in the exhaust manifold 4 can be conducted through the heater heat exchanger 23, to heat up the interior of the motor vehicle if needed.

When the internal combustion engine 1 or the coolant have reach a desired operating temperature, the rotary slides 15, 16 are controlled to open the main circuit 7 and to circulate a larger amount of coolant through the entire water jacket 12 of the internal combustion engine by means of the main coolant pump 11. The coolant is first supplied into the water jacket of the cylinder crankcase 2 through the inlet 17 and circulated in the water jacket of the cylinder crankcase 2, before it flows through the coolant channels 32, the flow passages 33 of the cylinder head sealing 34 and the coolant channels 39 in to the water jacket 31, 30 of the exhaust manifold 4 and the cylinder head 3.

The invention claimed is:
1. An internal combustion engine, comprising:
a cylinder crankcase;
a cylinder head having an integrated exhaust manifold; and
a coolant circuit, comprising a continuous water jacket of the cylinder crankcase, the cylinder head and the integrated exhaust manifold and a collector communicating with the water jacket through passage openings, said passage openings having a reduced opening cross section, wherein first coolant channels of the water jacket are arranged in extension of a direction of flow through the passage openings and lead to the exhaust manifold, and wherein second coolant channels of the water jacket branch off laterally downstream of the passage openings relative to the direction of flow and lead to the cylinder crankcase.

2. The internal combustion engine of claim 1, wherein the collector is integrated into the cylinder crankcase.

3. The internal combustion engine of claim 1, wherein the collector has upwards oriented outlets, wherein the passage openings are arranged in the upward oriented outlets, and wherein the first coolant channels lead upwards in straight extension of the outlets and the passage openings.

4. The internal combustion engine of claim 1, wherein the passage openings are arranged below flow passages of a sealing of the cylinder head, and wherein the first coolant channels above the flow passages lead to the exhaust manifold and wherein the second coolant channels branch off below the flow passages.

5. The internal combustion engine of claim 1, wherein the cooling circuit further comprises a side branch which includes an electric cooling pump, and wherein the collector is connected to the side branch.

6. The internal combustion engine of claim 1, wherein the cooling circuit further comprises a side branch which includes a heater heat exchanger, and wherein the collector is connected to the side branch.

7. The internal combustion engine of claim 5, further comprising by means for supplying coolant from the coolant circuit to the collector after shutoff and/or during warm up of the internal combustion engine.

8. A method for operating the internal combustion engine of claim 1, comprising:
supplying a coolant which is circulated through the coolant circuit of the combustion engine into the collector after turning off of the internal combustion engine, to cool the integrated exhaust manifold and to minimize the amount of coolant which flows through the water jacket of the cylinder crankcase.

9. A method for operating the internal combustion engine of claim 1, comprising:
supplying a coolant which is circulated through the coolant circuit of the combustion engine into the collector after starting the internal combustion engine, to cool the integrated exhaust manifold and the cylinder head and to minimize the amount of coolant which flows through the water jacket of the cylinder crankcase.

10. The method of claim 9, wherein the coolant is supplied into the collector through a heater heat exchanger.

* * * * *